United States Patent
Wolfe et al.

(10) Patent No.: US 9,569,270 B2
(45) Date of Patent: Feb. 14, 2017

(54) MAPPING THREAD PHASES ONTO HETEROGENEOUS CORES BASED ON EXECUTION CHARACTERISTICS AND CACHE LINE EVICTION COUNTS

(75) Inventors: Andrew Wolfe, Los Gatos, CA (US); Thomas M. Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 1144 days.

(21) Appl. No.: 12/557,985

(22) Filed: Sep. 11, 2009

(65) Prior Publication Data
US 2011/0066828 A1 Mar. 17, 2011

(51) Int. Cl.
*G06F 9/50* (2006.01)
*G06F 11/34* (2006.01)

(52) U.S. Cl.
CPC ......... *G06F 9/5044* (2013.01); *G06F 11/3409* (2013.01)

(58) Field of Classification Search
CPC G06F 9/5044; G06F 11/3006; G06F 11/3017; G06F 11/3024; G06F 11/34; G06F 11/3409
See application file for complete search history.

(56) References Cited

U.S. PATENT DOCUMENTS

| | | |
|---|---|---|
| 5,394,548 A | 2/1995 | Nakajima et al. |
| 5,659,721 A | 8/1997 | Shen et al. |
| 5,968,115 A | 10/1999 | Trout |
| 6,243,788 B1 | 6/2001 | Franke et al. |
| 6,434,594 B1 | 8/2002 | Wesemann |
| 7,222,343 B2 | 5/2007 | Heyrman et al. |
| 7,269,713 B2 | 9/2007 | Anderson et al. |
| 7,318,125 B2 | 1/2008 | Chiang et al. |
| 7,434,002 B1 | 10/2008 | Zedlewski et al. |
| 7,437,581 B2 | 10/2008 | Grochowski et al. |
| 7,461,376 B2 | 12/2008 | Geye et al. |
| 7,526,661 B2 | 4/2009 | Nakajima et al. |
| 7,614,056 B1 | 11/2009 | Saxe et al. |
| 7,890,298 B2 | 2/2011 | Coskun et al. |
| 7,930,574 B2 | 4/2011 | Cai et al. |
| 8,468,532 B2 | 6/2013 | Aguilar, Jr. et al. |

(Continued)

FOREIGN PATENT DOCUMENTS

| | | |
|---|---|---|
| JP | H0628323 A | 2/1994 |
| JP | H0721045 A | 1/1995 |

(Continued)

OTHER PUBLICATIONS

International Search Report and Written Opinion of the International Searching Authority, International Application No. PCT/US2010/37498, mailed on Sep. 20, 2010, 7 pages.
Becchi, M. and Crowley, P., et al., "Dynamic Thread Assignment on Heterogeneous Multiprocessor Architectures," ACM, May 3-5, 2006, pp. 29-39, Ischia, Italy.

(Continued)

*Primary Examiner* — David J Huisman
(74) *Attorney, Agent, or Firm* — Moritt Hock & Hamroff LLP; Steven S. Rubin, Esq.

(57) ABSTRACT

Techniques are generally described for mapping a thread onto heterogeneous processor cores. Example techniques may include associating the thread with one or more predefined execution characteristics, assigning the thread to one or more heterogeneous processor cores based on the one or more predefined execution characteristics, and/or executing the thread by the respective assigned heterogeneous processor cores.

13 Claims, 5 Drawing Sheets

(56) References Cited

U.S. PATENT DOCUMENTS

| | | |
|---|---|---|
| 2003/0163648 A1 | 8/2003 | Smith |
| 2004/0215987 A1 | 10/2004 | Farkas et al. |
| 2005/0021931 A1 | 1/2005 | Anderson |
| 2005/0039185 A1 | 2/2005 | Heidari-Bateni et al. |
| 2005/0086660 A1 | 4/2005 | Accapadi et al. |
| 2005/0216775 A1 | 9/2005 | Inoue |
| 2005/0235126 A1 | 10/2005 | Ko et al. |
| 2006/0037017 A1 | 2/2006 | Accapadi |
| 2006/0168571 A1 | 7/2006 | Ghiasi et al. |
| 2007/0033592 A1 | 2/2007 | Roediger et al. |
| 2007/0050605 A1 | 3/2007 | Ferren et al. |
| 2007/0074011 A1 | 3/2007 | Borkar et al. |
| 2007/0283358 A1 | 12/2007 | Kasahara et al. |
| 2007/0294693 A1* | 12/2007 | Barham ........................ 718/102 |
| 2008/0244226 A1 | 10/2008 | Li |
| 2008/0250414 A1 | 10/2008 | Brokenshire et al. |
| 2009/0037911 A1 | 2/2009 | Ahuja et al. |
| 2009/0089792 A1 | 4/2009 | Johnson et al. |
| 2009/0217277 A1 | 8/2009 | Johnson |
| 2010/0005474 A1 | 1/2010 | Sprangle et al. |
| 2010/0077185 A1 | 3/2010 | Gopalan et al. |
| 2010/0268912 A1* | 10/2010 | Conte et al. ................... 712/20 |
| 2010/0332883 A1 | 12/2010 | Saxe et al. |

FOREIGN PATENT DOCUMENTS

| | | |
|---|---|---|
| JP | H10207850 A | 8/1998 |
| JP | H1131134 A | 2/1999 |
| JP | 2000148518 JP | 5/2000 |
| JP | 2003006175 A | 1/2003 |
| JP | 2004220608 | 8/2004 |
| JP | 2004326175 A | 11/2004 |
| JP | 2005031771 | 3/2005 |
| JP | 2006235907 A | 9/2006 |
| JP | 2007108944 A | 4/2007 |
| JP | 2007226587 A | 9/2007 |
| JP | 2007328415 A | 12/2007 |
| JP | 2008090546 A | 4/2008 |
| JP | 2008123205 A | 5/2008 |

OTHER PUBLICATIONS

Chen, T. et al., "A Location-Based Mobile Game Engine on the Heterogeneous Multi-Core Processor Architecture," Journal of Computational Information Systems, Jun. 2005, pp. 1-7, vol. 1, Issue. 2, Hong Kong, R.O.C.

Constantinou, T. et al., "Performance Implications of Single Thread Migration on a Chip Multi•Core", ACM SIGARCH Computer Architecture News, Nov. 2005, 12 pages, vol. 33, No. 4, Texas, USA.

Kumar, R. et al., "Single-ISA Heterogeneous Multi-Core Architectures for Multithreaded Workload Performance," In Proceedings of the 31st International Symposium on Computer Architecture, IEEE, Jun. 19-23, 2004, 12 pages, Munich, Germany.

International Search Report and Written Opinion of the International Searching Authority, International Application No. PCT/US10/37489, mailed on Sep. 20, 2010, 8 pages.

International Search Report and Written Opinion of the International Searching Authority, International Application No. PCT/US10/37496, mailed on Sep. 21, 2010, 8 pages.

Kumar, R., et al., "Processor Power Reduction via Single ISA Heterogeneous Multi-Core Architectures," Computer Architecture Letters, 2003, pp. 4, vol. 2, Issue 1.

European Search Report for corresponding European application No. 10.15.4703, European Patent Office, The Hague, Netherlands, mailed on May 3, 2010, 11 pages.

Hao, S., et al., "A Prediction based CMP Cache Migration Policy," 10th IEEE International Conference on High Performance Computing and Communications, pp. 374-381 (Sep. 25-27, 2008).

Peir, J-K., et al., "Bloom Filtrng Cache Misses for Accurate Data Speculation and Preething" Poceedings of the 16th international conference on Supercomputing, pp. 189-198 (Jun. 22-26, 2002).

Sarkar, A., et al., "Push-assisted migration of real-time tasks in multi-core processors," Proceedings of the 2009 ACM SIGPLAN/SIGBED conference on Languages, compilers, and tools for embedded systems. vol. 44, Issue 7, pp. 80-89 (Jun. 19-20, 2009).

"Bloom Filter," accessed at https://en.wikipedia.org/wiki/Bloom_filter, Apr. 1, 2012, 9 pages.

* cited by examiner

MAPPING THREAD PHASES ONTO HETEROGENEOUS CORES BASED ON EXECUTION CHARACTERISTICS AND CACHE LINE EVICTION COUNTS

CROSS REFERENCE TO RELATED APPLICATIONS

This application may be related to U.S. patent application Ser. No. 12/427,602, filed Apr. 21, 2009, now U.S. Pat. No. 9,189,282, U.S. patent application Ser. No. 12/557,971, filed Sep. 11, 2009, now U.S. Pat. No. 8,881,157, and U.S. patent application Ser. No. 12/557,864, filed Sep. 11, 2009, the entire disclosures of which are incorporated herein by reference.

BACKGROUND

The present disclosure is related to multi-core computer systems having heterogeneous hardware and, more particularly, to efficient mapping of threads onto the heterogeneous hardware based, at least in part, on the execution characteristics of a software application executed on the multi-core computer system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
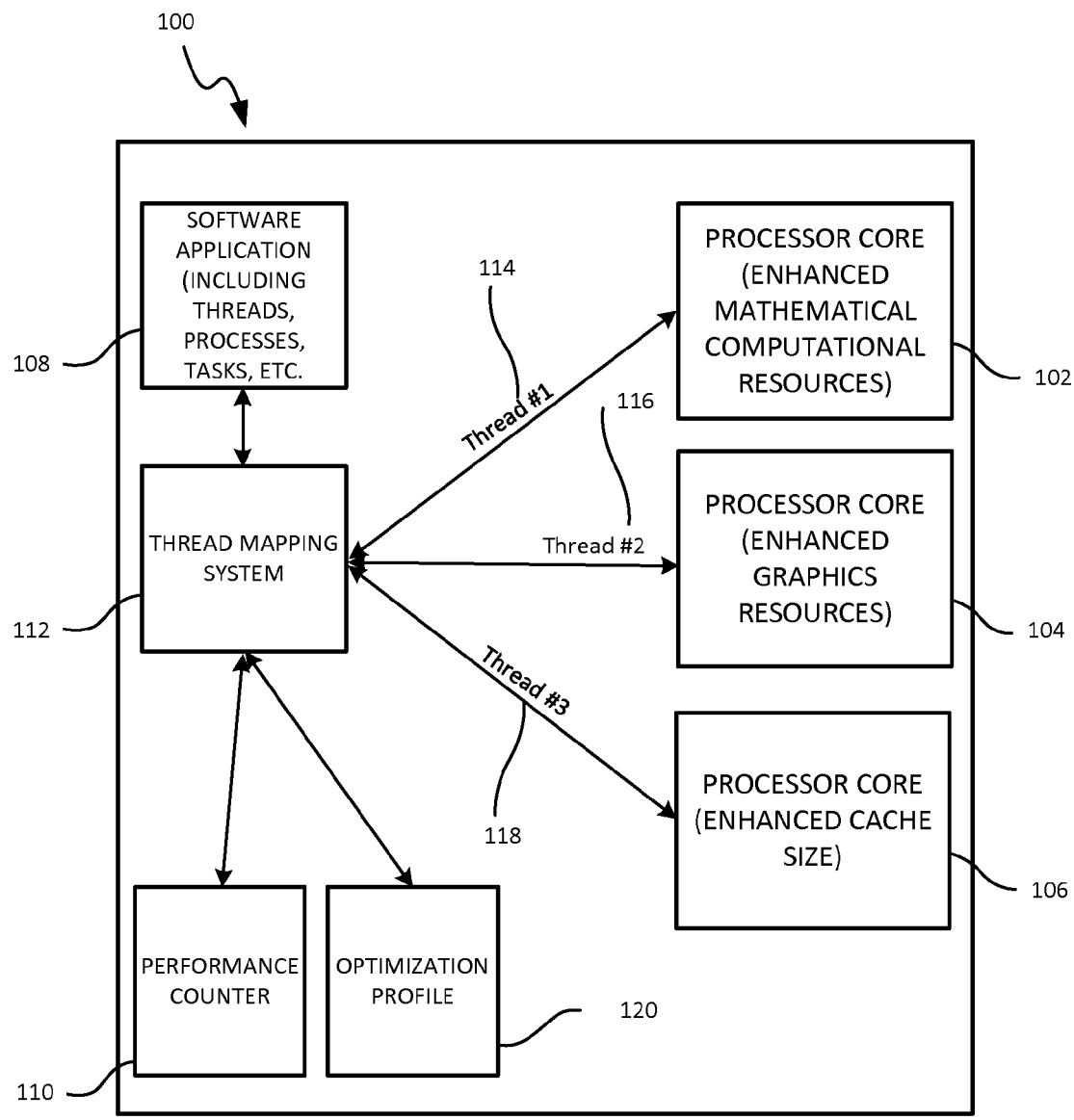
FIG. 1 is a block diagram illustrating an example multi-core system having multiple heterogeneous cores.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, systems, devices, and/or apparatus related to multi-core computer systems having heterogeneous hardware and, more particularly, to efficient mapping of threads onto the heterogeneous hardware based, at least in part, on the execution characteristics of a software application executed on the multi-core computer system.

The present disclosure contemplates that some computer systems may include a plurality of processor cores. In a multi-core system with heterogeneous hardware, some cores may have certain hardware capabilities not available to other cores. In some example computer systems, at least one thread (which may be a sequence of instructions and which may execute in parallel with other threads) may be assigned to an appropriate core. Thread/core mapping may be utilized to associate threads with appropriate cores. In some example computer systems, a thread may be reassigned from one core to another core before execution of the thread is complete. While the present disclosure generally refers to threads, it is within the scope of the disclosure to include the mapping of processes, tasks and the like.

FIG. 1 is a block diagram illustrating an example multi-core system having multiple heterogeneous cores arranged in accordance with at least some embodiments of the present disclosure. An example multi-core system 100 may include a plurality of processor cores 102, 104, and/or 106. In an example embodiment, a multi-core system 100 may include one or more cores 102, 104, and/or 106, each core having different capabilities. In other words, a multi-core system 100 may include heterogeneous hardware. For example, one core 102 may include enhanced graphics resources, another core 104 may include enhanced mathematical computational resources and another core 106 may include a large capacity cache.

As depicted in FIG. 1, a software application 108 may include several threads (or processes and/or tasks). To efficiently map the threads to an appropriate core, the thread mapping methods described herein may be implemented by a thread mapping system 112 operably connected to the software application 108. In some embodiments, a performance counter 110 may also be operably coupled to the thread mapping system 112 to assist in efficiently mapping threads 114, 116 and/or 118 to one or more cores 102, 104 and/or 106, which will be described in more detail below.

In the example embodiment of FIG. 1, the thread mapping system 112 may map threads to an appropriate core. Specifically, the thread mapping system 112 may map a first thread (thread #1) 114 to core 102, may map a second thread (thread #2) 116 to core 104, and may map a third thread (thread #3) 118 to core 106.

In some example embodiments, a thread which may initially benefit from enhanced graphics capabilities may be initially executed on a core having enhanced graphics resources. Based at least in part on the expectation that the thread may later benefit from enhanced mathematical computational capabilities, data pertaining to the thread may be transmitted to a core having enhanced mathematical computational to complete its execution.

In some example embodiments, cores may include different instruction sets; different accelerators (e.g., DSPs (digital signal processors) and/or different SSEs (streaming SIMD (single instruction, multiple data) extensions)); larger and/or smaller caches (such as L1 and L2 caches); different branch predictors (the parts of a processor that determine whether a conditional branch in the instruction flow of a program is likely to be taken or not); and/or the like. Based at least in part on these and/or other differences between cores, different cores may provide different capabilities for certain tasks.

In some example embodiments, some threads may be associated with one or more execution characteristics, which may be expressed and/or based on information collected by one or more performance counters, for example. In some example embodiments, thread mapping may be based at least in part on one or more execution characteristics.

In some example embodiments, threads may be mapped (utilizing the thread mapping system 112, for example) to individual cores based at least in part on the hardware capabilities of the cores. For example, a thread associated with a large L1 (cache memory) demand may be mapped to a core including large L1 hardware. Similarly, a thread associated with a large SSE (instruction set) demand may be mapped to a core including native SSE hardware implementation. These examples are non-limiting, and it will be understood that threads may be mapped based at least in part on any hardware characteristic, instruction set, and/or other characteristic of a core and/or a thread. Further, the present disclosure contemplates that, if the threads are not mapped to a core based on hardware capabilities, the thread may instead be processed using software emulation, which may increase processing time for that thread.

In some example embodiments, thread execution characteristics may vary over time based on a phase of the program running in the thread. For example, a thread may originally have a large L1 demand, but may have a minimal L1 demand at a later time. The thread may be mapped to different cores at different times during its execution to improve performance. For example, the thread may be mapped to a core including a relative large L1 cache when L1 demand is high, and/or the thread may be mapped to a core having a smaller L1 cache when L1 demand is lower.

In some example embodiments, determining whether to map a thread to a different core and/or when to perform such a mapping may include evaluating of at least a portion of an execution profile that may include data related to a prior execution of the thread. In some example embodiments, the execution profile may be generated using a freeze-dried ghost page execution profile generation method as disclosed in U.S. Patent Application Publication No. 2007/0050605, which is incorporated by reference. This method may use a shadow processor, or in some embodiments a shadow core, to simulate the execution of at least a portion of a thread in advance and to generate performance statistics and measurements related to this execution.

In some example embodiments, processors and/or caches may be configured to collect information as a program executes. For example, such information may include which cache lines the program references. In some example embodiments, data about cache usage (e.g., a count of the number of cache lines of a thread process remaining) may be evaluated to determine which threads should be replaced. In an example embodiment, a performance counter may be configured to track line evictions of running threads and/or may use that information to decide which tasks may be flushed out to begin a higher priority task. A performance counter may also be configured to track the line evictions since a task has started.

An example multi-core system may include a performance counter adapted for use in accordance with the present disclosure. Various cores may be operatively coupled to a performance counter. A performance counter may be configured to store a count number (or a performance count) indicating the number of hardware-related activities within a computer system, for example. Thread mapping (from one core to another core, for example) may be at least partially determined using data collected by performance counter.

Some example embodiments may consider the size of a cache footprint for a particular task. In some example embodiments, Bloom filters may be used to characterize how big the cache footprint is for a thread. An example Bloom filter may be a space-efficient probabilistic data structure that may be used to test whether an element is a member of a set. When using some example Bloom filters, false positives are possible, but false negatives are not. In some example Bloom filters, elements may be added to the set, but may not be removed (though this can be addressed with a counting filter). In some example Bloom filters, the more elements that are added to the set, the larger the probability of false positives. An empty Bloom filter may be a bit array of m bits, all set to 0. In addition, k different hash functions may be defined, each of which may map or hash some set element to one of the m array positions with a uniform random distribution. To add an element, the element may be fed to each of the k hash functions to get k array positions. The bits at these positions may be set to 1. To query for an element (e.g., to test whether it is in the set), the element may be fed to each of the k hash functions to get k array positions. In some example Bloom filters, if the bit at any of these positions is 0, then the element is not in the set; if the element was in the set, then all of the bits at the k array positions would have been set to 1 when it was inserted. In some example Bloom filters, if all of the bits at the k array positions are 1, then either the element is in the set, or the bits were set to 1 during the insertion of other elements.

In some example embodiments, a Bloom filter may be used to track which portions of the cache are being used by the current thread. For example, the filter may be emptied when the thread is first scheduled onto the core. Each time a cache line is used by the thread, it may be added to the filter set. A sequence of queries may be used to estimate the thread footprint in order to evaluate the cost of cache data migration. In some example embodiments, a simple population count of the number of "1" bits in the filter may be used to estimate the cache footprint of the thread. In some example embodiments, counting Bloom filters may be used. In a counting Bloom filter, each filter element may be a counter which may be incremented when a cache line is used by the thread and may be decremented when the cache line is invalidated.

In some example embodiments, data associated with threads may be evaluated by the multi-core system to determine when a thread should be migrated to another core and/or to which core the thread should be migrated. For example, a system may use real-time computing (RTC) data relating to a thread to determine whether the thread is falling behind a target deadline. If the thread is falling behind the target deadline, the thread may be migrated to a faster core, for example.

In some example embodiments, the cache data for a thread migration may be pre-fetched. The prefetching may be performed by a hardware prefetcher as is known in the art. One such prefetcher is disclosed in U.S. Pat. No. 7,318,125, which is incorporated by reference. That is, when the system is preparing to transmit a thread to a new core, references from the current core may be sent to the new core to prepare for the migration. Thus, the new core may be "warmed up" in preparation for the migration. In some embodiments, substantially all of the data relating to the thread to be migrated may be pre-fetched by the new core. In some other example embodiments, a portion of the data relating to the thread to be migrated may be pre-fetched by the new core. For example, the cache misses, hits, and/or line evictions may be pre-fetched. In some example embodiments, rather than caching the data in the new core (and thereby filling up the new core with data that may ultimately not be required), the data may be pre-fetched to a side/stream buffer, for example.

As used herein, "cache hit" may refer to a successful attempt to reference data that has been cached, as well as the corresponding data. As used herein, "cache miss" may refer to an attempt to reference data that has not been found in the cache, as well as the corresponding data. As used herein, "line eviction" may refer to removing a cached line from the cache, such as to make space for different data in the cache. Line eviction may also include a write-back operation whereby modified data in the cache is written to main memory or a higher cache level prior to being removed from the cache.

Figure 2:
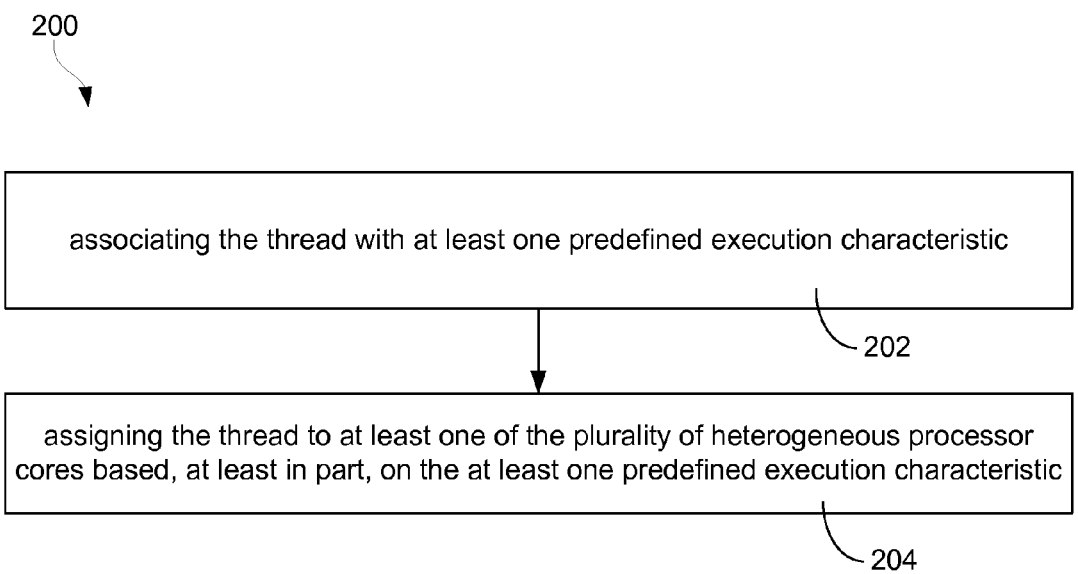
FIG. 2 is a flowchart depicting an example method for mapping a thread onto at least one of a plurality of heterogeneous processor cores.

FIG. 2 is a flowchart depicting an example method 200 of mapping a thread onto at least one of a plurality of heterogeneous processor cores that is arranged in accordance with at least some embodiments of the present disclosure. Example methods 200 may include one or more of processing operations 202 and/or 204.

Processing may begin at operation 202, which may include associating a thread with one or more predefined execution characteristics. Processing may flow from operation 202 to operation 204. Operation 204 may include assigning the thread to at least one of the heterogeneous processor cores based, at least in part, on the one or more predefined execution characteristics.

In some embodiments, each thread may include metadata identifying how a software application associated with the thread may be configured for operation. In some examples, the method may further include associating metadata with the thread. The metadata may identify how a software application associated with the thread may be configured for operation. In one example, the metadata may be either embedded in the thread or separate from the thread. In another embodiment, the method may include transmitting the metadata to a thread mapping software tool (as implemented by the thread mapping system 112, for example). A thread mapping software tool may be configured to evaluate the thread and assign the thread to a predetermined heterogeneous processor core. Further, the metadata may identify a heterogeneous processor core with appropriate capabilities and/or availability for executing the thread. In another embodiment, the assigning operation may include assigning the thread to one or more heterogeneous processor cores based, at least in part, on the metadata.

In an example embodiment, a software application may operate in different phases, where each phase may be associated with operating requirements of a specific task related to the phase. In this manner, the method may be configured to determine an appropriate core to process the thread based on what type of processing may be needed during a particular phase. In one example, a software application may include several phases including a first phase during the start of the software application, a second phase during the interface display period, a third phase during a period of text input, a fourth phase during a spell check task and/or other similar phases.

In another embodiment, the assigning operation may include dynamically assigning the thread to a heterogeneous processor core. In this manner, the assigning operation may be performed without knowledge of the metadata and/or the metadata's contents.

In yet another embodiment, the thread may include a performance count. In this embodiment, the assigning operation may include identifying the heterogeneous processor core(s) based, at least in part, on the performance count and/or information collected using the performance counter associated with one or more of the heterogeneous processor cores. In another embodiment, the assigning operation may assign a thread based, at least in part, on the predefined execution characteristics, the performance count from the performance counter and/or information collected using the performance counter associated with one or more of the heterogeneous processor cores.

Figure 3:
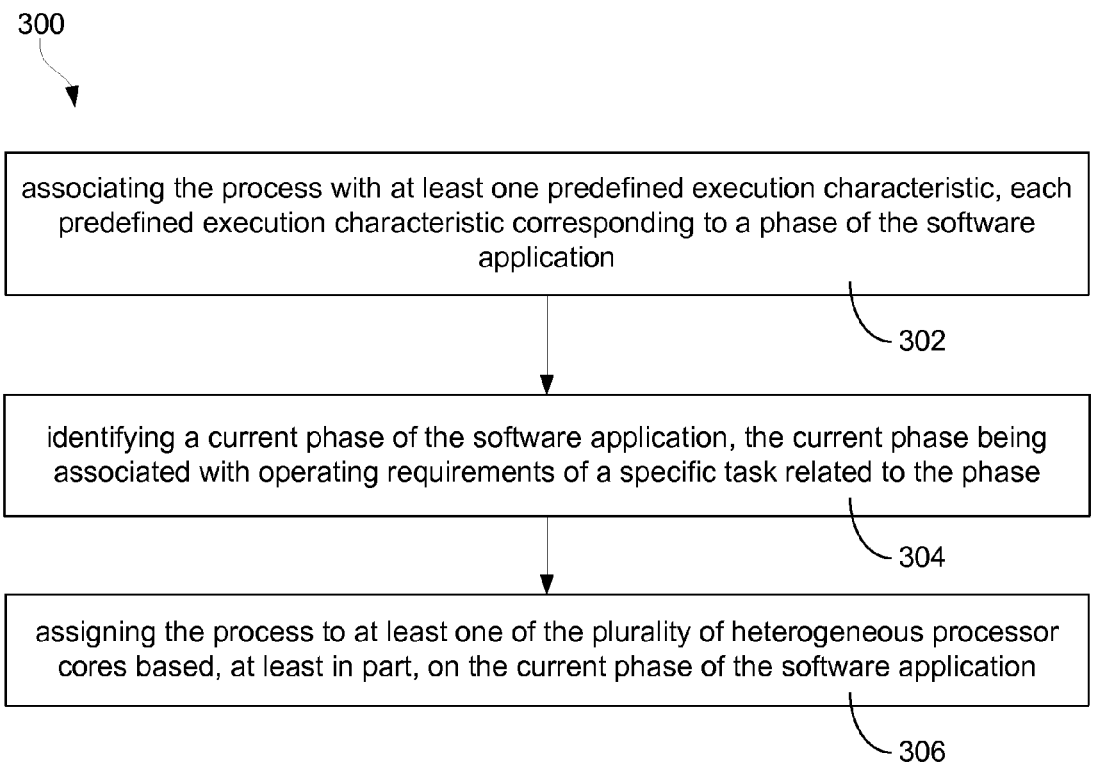
FIG. 3 is a flowchart depicting an example method of mapping a process associated with a software application onto at least one of a plurality of heterogeneous processor cores.

FIG. 3 is a flowchart depicting an example method 300 of mapping a process associated with a software application onto at least one of a plurality of heterogeneous processor cores, in accordance with at least some embodiments of the present disclosure. The example methods 300 may include one or more of processing operations 302, 304 and/or 306.

Processing for method 300 may begin at operation 302, which may include associating the process with one or more predefined execution characteristic(s), where each predefined execution characteristic may correspond to a phase of the software application. Processing may then continue from operation 302 to operation 304, which may include identifying a current phase of the software application. The current phase may be associated with operating requirements of a specific task related to the phase. Processing may then continue from operation 304 to operation 306, which may include assigning the process to at least one of the heterogeneous processor cores based, at least in part, on the current phase of the software application.

In an example embodiment, each phase may be identified by a predetermined breakpoint in the software application and/or a predetermined point where the software application may switch from a first task to a second task. In another embodiment, the method may further include associating a performance count from a performance counter with the process. In such an embodiment, assigning the process may include assigning the process to the heterogeneous processor core(s) based, at least in part, on the predefined execution characteristics, the performance count from a performance counter associated with the heterogeneous processor cores and/or information collected using the performance counter.

In yet another embodiment, the software application may be managed by an execution-based optimization profile 120 (such as a freeze dried ghost page, for example) associated with historical metadata related to past execution of the software application by the heterogeneous processor cores.

Figure 4:
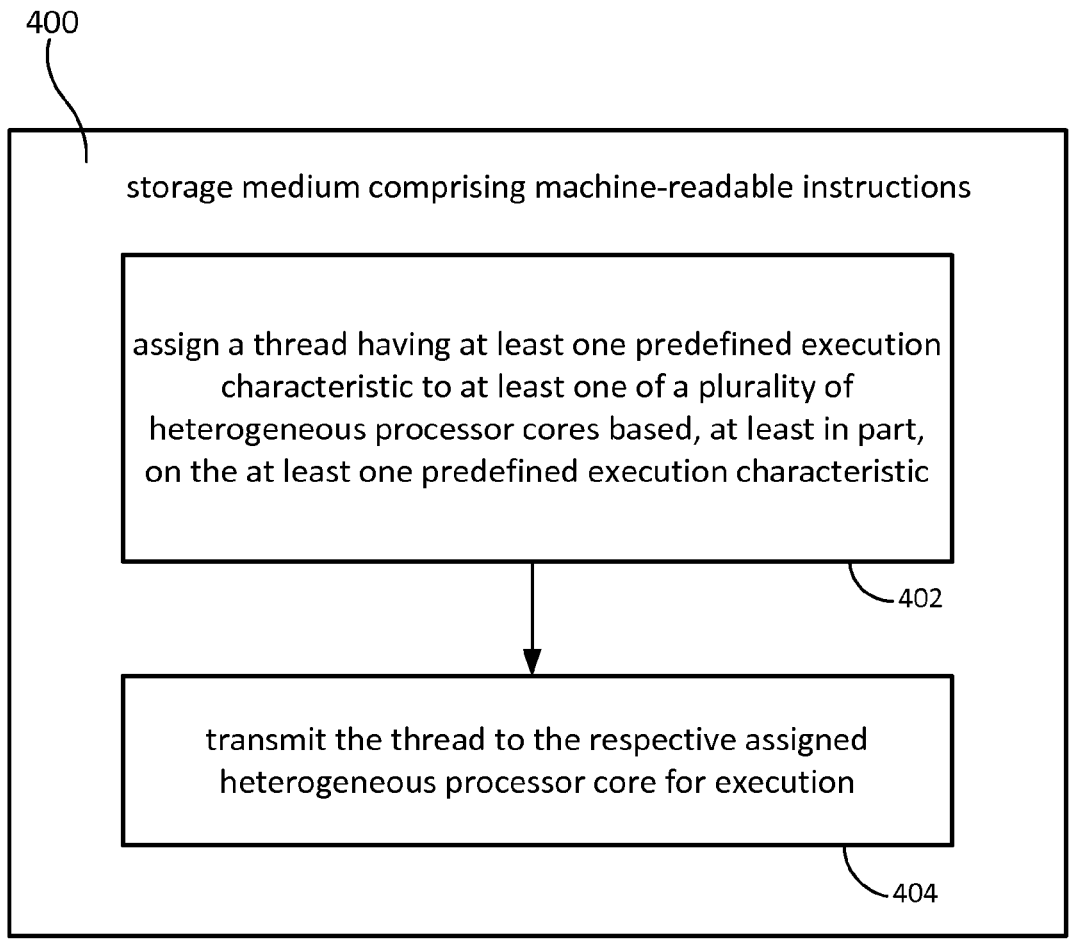
FIG. 4 is a schematic diagram illustrating an example article including a storage medium comprising machine-readable instructions.

FIG. 4 is a schematic diagram of an example article including a storage medium 400 comprising machine-readable instructions arranged in accordance with at least some embodiments of the present disclosure. When executed by one or more processing units, the machine readable instructions may operatively enable a computing platform to assign a thread having one or more predefined execution characteristic(s) to at least one of a plurality of heterogeneous processor cores based, at least in part, on the one or more predefined execution characteristic(s) (operation 402); and transmit the thread to the respective assigned heterogeneous processor core for execution (operation 404).

Figure 5:
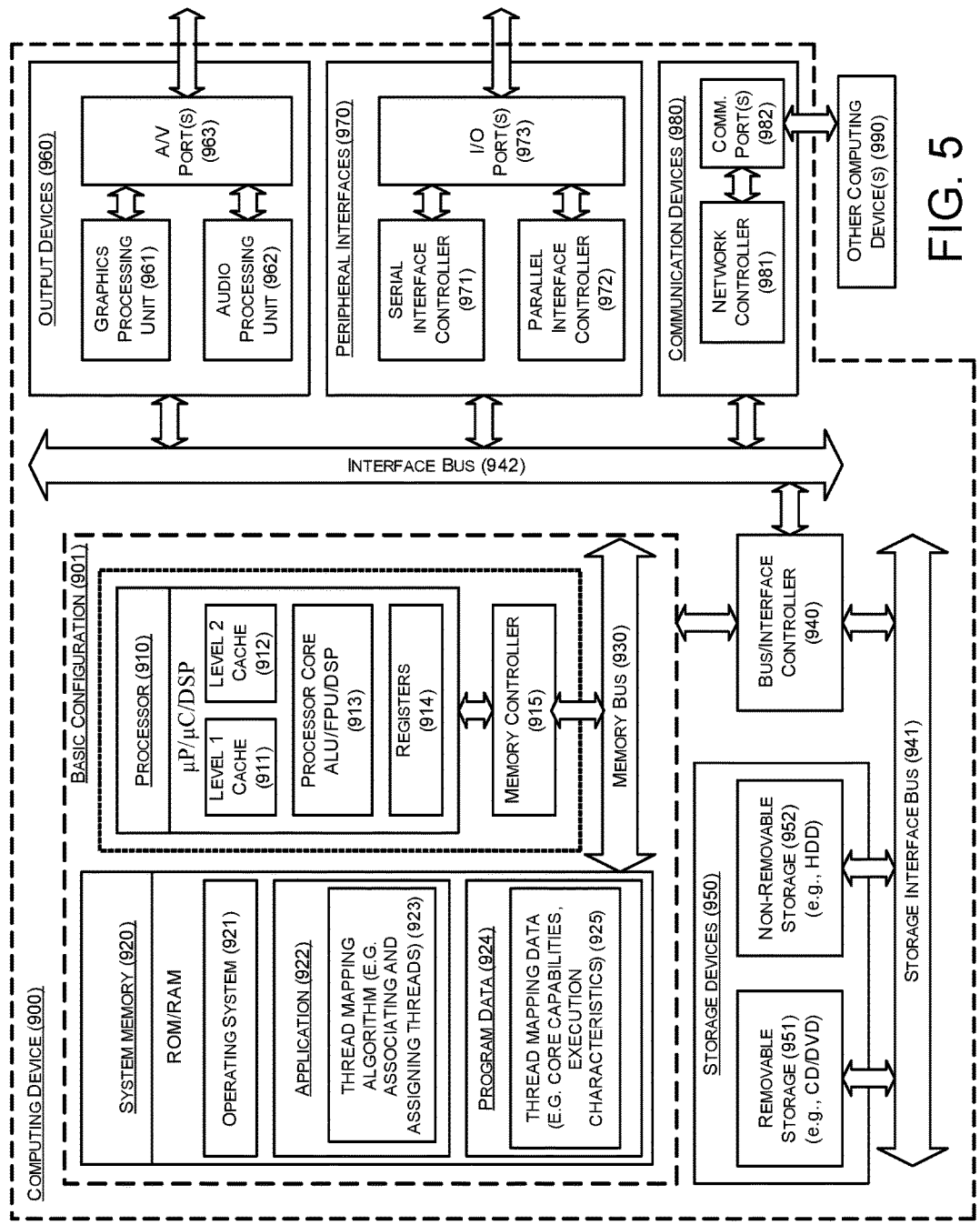
FIG. 5 is a block diagram illustrating an example computing device that may be arranged for thread mapping implementations, all configured in accordance with at least some embodiments of the present disclosure.

FIG. 5 is a block diagram illustrating an example computing device 900 that is arranged for thread mapping in accordance with at least some embodiments of the present disclosure. In a very basic configuration 901, computing device 900 may typically include one or more processors 910 and system memory 920. A memory bus 930 can be used for communicating between the processor 910 and the system memory 920.

In another example embodiment, a multi-core processor may include a first processor core and a second processor core. In this embodiment, the multi-core processor may be configured to assign a thread with predefined execution characteristics to the first processor core or the second processor core based, at least in part, on the predefined execution characteristics. The multi-core processor may also be configured to transmit the thread to the first processor core or the second processor core assigned to the thread for execution. In one example, the first core processor may be core 102 and the second processor core may be core 106.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 may include a thread mapping algorithm 923 that may be arranged to associate a thread with one or more execution characteristics and assign the thread to at least one heterogeneous hardware component. Program Data 924 may include thread mapping data 925 that may be useful for mapping the thread to an appropriate heterogeneous hardware component. In some embodiments, application 922 can be arranged to operate with program data 924 on an operating system 921 such that a thread may be efficiently mapped to an appropriate processor core in accordance with various methods described herein. This described basic configuration is illustrated in FIG. 5 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of computing device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to assign a thread to at least one of a plurality of heterogeneous processor cores, the method comprising:

identifying, by a multi-core processor, a first phase of the thread based on a breakpoint of the thread, wherein the first phase is related to a first task, wherein the multi-core processor includes the plurality of heterogeneous processor cores;

identifying, by the multi-core processor, a second phase of the thread based on the breakpoint of the thread, wherein the second phase is related to a second task, and the breakpoint is effective to identify a switch from the first task to the second task during an execution of the thread;

prior to executing the first phase of the thread, associating, by the multi-core processor, the first phase of the thread with a first execution characteristic based on the first task;

prior to executing the first phase of the thread, associating, by the multi-core processor, the second phase of the thread with a second execution characteristic based on the second task, wherein the second execution characteristic is different from the first execution characteristic;

receiving, by the multi-core processor, information from a performance counter associated with the plurality of heterogeneous processor cores, wherein the information includes performance counts indicating respective numbers of cache line evictions among caches associated with the plurality of heterogeneous processor cores;

identifying, by the multi-core processor, a first processor core among the plurality of heterogeneous processor cores based, at least in part, on the first processor core including a first number of cache line evictions, wherein the first number of cache line evictions is greater than a threshold, and the first number of cache line evictions is among the respective numbers of cache line evictions indicated by the performance counts;

associating, by the multi-core processor, the first phase of the thread with the first processor core based on the identification of the first processor core as including the first number of cache line evictions that is greater than the threshold;

identifying, by the multi-core processor, a second processor core among the plurality of heterogeneous processor cores based, at least in part, on the second processor core including a second number of cache line evictions, wherein the second number of cache line evictions is greater than the threshold, and the second number of cache line evictions is among the respective numbers of cache line evictions indicated by the performance counts;

associating, by the multi-core processor, the second phase of the thread with the second processor core based on the identification of the second processor core as including the second number of cache line evictions that is greater than the threshold;

executing, by the multi-core processor, the first phase of the thread on the first processor core based, at least in part, on the association of the first phase of the thread with the first execution characteristic and the association of the first phase of the thread with the first processor core, such that the first processor core performs the first task;

determining, by the multi-core processor, that the thread has reached the breakpoint; and in response to the determining, executing, by the multi-core processor, the second phase of the thread on at least the second processor core based, at least in part, on the association of the second phase of the thread with the second execution characteristic and the association of the second phase of the thread with the second processor core, wherein the second processor core is different from the first processor core, such that the second processor core performs the second task.

2. The method of claim 1, further comprising:
associating metadata with the thread, wherein the metadata identifies how a software application associated with the thread is configured for operation.

3. The method of claim 2, wherein the metadata associated with the thread is either embedded in the thread or separate from the thread.

4. The method of claim 3, further comprising:
transmitting the metadata to a thread mapping software tool, the thread mapping software tool being configured to assign the thread to the first processor core.

5. The method of claim 2, wherein the metadata identifies one or more of the plurality of heterogeneous processor cores capable of executing the thread.

6. The method of claim 1, wherein the thread includes metadata that identifies how a software application associated with the thread is configured for operation.

7. A method to assign a process associated with a software application to a plurality of heterogeneous processor cores, the method comprising:
identifying, by a thread mapping system, a first phase of the process based on a breakpoint of the process, wherein the first phase is related to a first task, wherein the thread mapping system is separate from the plurality of heterogeneous processor cores;

identifying, by the thread mapping system, a second phase of the process based on the breakpoint of the process, wherein the second phase is related to a second task, and the breakpoint is effective to identify a switch from the first task to the second task during an execution of the process;

prior to executing the first phase of the process, associating, by the thread mapping system, the first phase of the process with a first execution characteristic based on the first task;

prior to executing the first phase of the process, associating, by the thread mapping system, the second phase of the process with a second execution characteristic based on the second task, wherein the second execution characteristic is different from the first execution characteristic;

receiving, by the thread mapping system, information from a performance counter associated with the plurality of heterogeneous processor cores, wherein the information includes performance counts indicating respective numbers of cache line evictions among caches associated with the plurality of heterogeneous processor cores;

identifying, by the thread mapping system, a first processor core based, at least in part, on the first processor core including a first number of cache line evictions, wherein the first number of cache line evictions is greater than a threshold, and the first number of cache line evictions is among the respective numbers of cache line evictions indicated by the performance counts, wherein the first processor core is amongst the plurality of heterogeneous processor cores;

associating, by the thread mapping system, the first phase of the process with the first processor core based on the identification of the first processor core as including the first number of cache line evictions that is greater than the threshold;

identifying, by the thread mapping system, a second processor core based, at least in part, on the second processor core including a second number of cache line evictions, wherein the second number of cache line evictions is greater than a threshold, and the second number of cache line evictions is among the respective numbers of cache line evictions indicated by the performance counts, wherein the second processor core is amongst the plurality of heterogeneous processor cores, and wherein the second processor core is different from the first processor core;

associating, by the thread mapping system, the second phase of the process with the second processor core based on the identification of the second processor core as including the second number of cache line evictions that is greater than the threshold;

assigning, by the thread mapping system, the first phase of the process on the first processor core based, at least in part, on the association of the first phase of the process with the first execution characteristic and the association of the first phase of the process with the first processor core, such that the first processor core performs the first task;

identifying, by the thread mapping system, that the process has reached the breakpoint; and in response to identifying that the process has reached the breakpoint, assigning, by the thread mapping system, the second phase of the process on at least the second processor core based, at least in part, on the association of the second phase of the process with the second execution characteristic and the association of the second phase of the process with the second processor core, such that the second processor core performs the second task.

8. The method of claim 7, further comprising managing the software application utilizing an execution-based optimization profile associated with historical metadata related to past execution of the software application by one or more of the first processor core, the second processor core, and other processor cores amongst the plurality of heterogeneous processor cores.

9. An article, comprising:
a non-transitory storage medium comprising machine-readable instructions stored thereon, which, in response to execution by one or more processing units, operatively enable a computing platform to:
identify a first phase of a thread based on a breakpoint of the thread, wherein the first phase is related to a first task;

identify a second phase of the thread based on the breakpoint of the thread, wherein the second phase is related to a second task, and the breakpoint is effective to identify a switch from the first task to the second task during an execution of the thread;

prior to an execution of the first phase of the thread, associate the first phase of the thread with a first execution characteristic based on the first task;

prior to the execution of the first phase of the thread, associate the second phase of the thread with a second execution characteristic based on the second task, wherein the second execution characteristic is different from the first execution characteristic;

identify a first processor core based, at least in part, on information received from a performance counter associated with at least the first processor core and a second processor core, wherein the information includes performance counts indicating respective numbers of cache line evictions among caches associated with the first and second processor cores;

associate the first phase of the thread with the first processor core based on the identification of the first processor core;

identify the second processor core based, at least in part, on the respective numbers of cache line evictions indicated by the performance counts;

associate the second phase of the thread with the second processor core based on the identification of the second processor core;

assign the first phase of the thread on the first processor core based, at least in part, on the association of the first phase of the thread with the first execution characteristic and the association of the first phase of the thread with the first processor core, such that the first processor core performs the first task;

determine, that the thread has reached the breakpoint; and in response to the determination, assign the second phase of the thread on at least the second processor core based, at least in part, on the association of the second phase of the thread with the second execution characteristic and the association of the second phase of the thread with the second processor core, where the second processor core is different from the first processor core, such that the second processor core performs the second task.

10. The article of claim 9, wherein:

the machine-readable instructions enable the platform to associate the first phase of the thread with the first processor core based, at least in part, on the first execution characteristic, the information from the performance counter, and information collected using the performance counter associated with at least one of the first and second processor cores.

11. A multi-core processor, comprising:

a first processor core; and a second processor core;

wherein the multi-core processor is configured to:

identify a first phase of a thread based on a breakpoint of the thread, wherein the first phase is related to a first task;

identify a second phase of the thread based on the breakpoint of the thread, wherein the second phase is related to a second task, and the breakpoint is effective to identify a switch from the first task to the second task during an execution of the thread;

prior to an execution of the first phase of the thread, associate the first phase of the thread with a first execution characteristic based on the first task;

prior to the execution of the first phase of the thread, associate the second phase of the thread with a second execution characteristic based on the second task, wherein the second execution characteristic is different from the first execution characteristic;

receive information from a performance counter associated with the first and second processor cores, wherein the information includes performance counts indicating respective numbers of cache line evictions among caches associated with the first and second processor cores;

identify the first processor core based, at least in part, on the first processor core including a first number of cache line evictions, wherein the first number of cache line evictions is greater than a threshold, and the first number of cache line evictions is among the respective numbers of cache line evictions;

associate the first phase of the thread with the first processor core based on the identification of the first processor core as including the first number of cache line evictions that is greater than the threshold;

identify the second processor core based, at least in part, on the second processor core including a second number of cache line evictions, wherein the second number of cache line evictions is greater than the threshold, and the second number of cache line evictions is among the respective numbers of cache line evictions;

associate the second phase of the thread with the second processor core based on the identification of the second processor core as including the second number of cache line evictions that is greater than the threshold;

execute the first phase of the thread on the first processor core based, at least in part, on the association of the first phase of the thread with the first execution characteristic and the association of the first phase of the thread with the first processor core, such that the first processor core performs the first task;

determine that the thread has reached the breakpoint; and in response to the determination, execute the second phase of the thread on the second processor core based, at least in part, on the association of the second phase of the thread with the second execution characteristic and the association of the second phase of the thread with the second processor core, where the second processor core, such that the second processor core performs the second task.

12. The multi-core processor of claim 11, wherein the first processor core has a first capability and the second processor core has a second capability that is different from the first capability such that the multi-core processor comprises heterogeneous hardware.

13. The multi-core processor of claim 12, wherein each of the first capability and the second capability corresponds to at least one of: a graphics resource, a mathematical computational resource, an instruction set, an accelerator, streaming single instruction multiple data extensions, a cache size, and a branch predictor.

* * * * *

UNITED STATES PATENT AND TRADEMARK OFFICE
CERTIFICATE OF CORRECTION

PATENT NO. : 9,569,270 B2
APPLICATION NO. : 12/557985
DATED : February 14, 2017
INVENTOR(S) : Wolfe et al.

It is certified that error appears in the above-identified patent and that said Letters Patent is hereby corrected as shown below:

On the Title Page

On Page 2, in Item (56), under "OTHER PUBLICATIONS", in Column 2, Line 29, delete "Poceedings of" and insert -- Proceedings of --, therefor.

In the Specification

In Column 6, Line 26, delete "may then continue" and insert -- may continue --, therefor.

Signed and Sealed this
Fifteenth Day of August, 2017

Joseph Matal
*Performing the Functions and Duties of the
Under Secretary of Commerce for Intellectual Property and
Director of the United States Patent and Trademark Office*